C. BOWEN.
BUMPER FOR AUTOMOBILES.
APPLICATION FILED DEC. 31, 1919.

1,406,921.

Patented Feb. 14, 1922.

Charles Bowen INVENTOR.
BY
A. G. Burns ATTORNEY.

UNITED STATES PATENT OFFICE.

CHARLES BOWEN, OF FORT WAYNE, INDIANA.

BUMPER FOR AUTOMOBILES.

1,406,921.

Specification of Letters Patent. Patented Feb. 14, 1922.

Application filed December 31, 1919. Serial No. 348,601.

*To all whom it may concern:*

Be it known that I, CHARLES BOWEN, a citizen of the United States of America, and resident of Fort Wayne, in the county of Allen and State of Indiana, have invented certain new and useful Improvements in Bumpers for Automobiles, of which the following is a specification.

This invention relates to improvements in bumpers for automobiles of that type having a frame that protrudes at its ends, and the object of the improvement is to provide a construction adapted for attachment to the frame of the automobile without making any alterations thereof preliminary to the attachment of the bumper and which is so formed as to be attached to the frame at widely separated points thereon to affect rigidity of support.

The object of the invention is accomplished by the construction illustrated in the accompanying drawings in which:—

Figure 1:
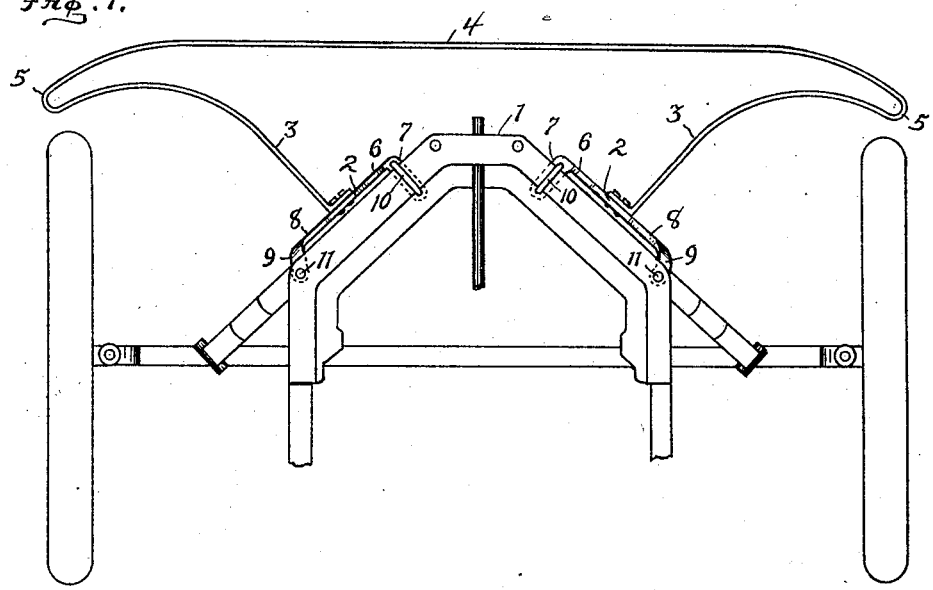
Figure 2:
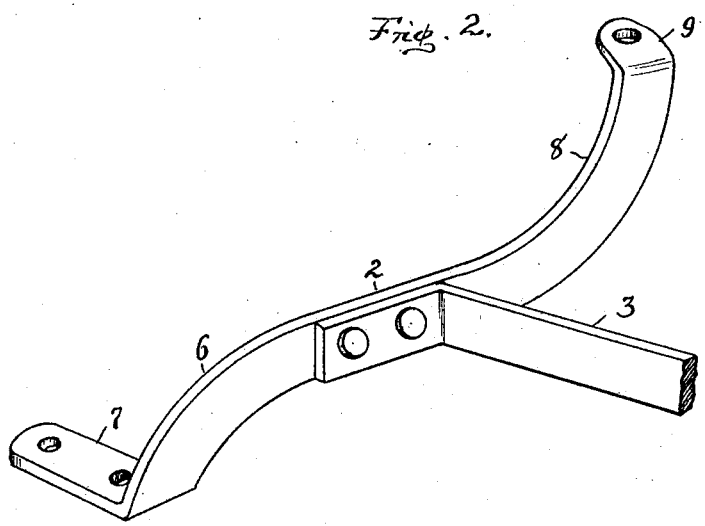

Fig. 1 is a plan view of the bumper including its anchors and that portion of an automobile to which they are secured; and, Fig. 2 is an enlarged detail view in perspective showing one of the anchors and the corresponding end portion of the bumper proper.

Similar characters of reference indicate corresponding parts in both views and having reference now to the same:

1 is the protruding end of an automobile frame of a well-known type, to which are secured in opposite positions a pair of anchors 2 with which the opposite interned ends 3 of the bumper proper 4 are correspondingly fixed. The bumper proper is formed of a flat bar of spring metal with oppositely projecting hooks 5 and corresponding inwardly slanting extremities 3.

Each anchor 2 is formed of a metallic bar, the corresponding extremity 3 of the bumper being rigidly secured to the bar at approximately the middle thereof. The forward portion 6 of the bar is turned downwardly and at its end has a lateral projection 7, and the rear portion 8 of the bar is turned upwardly and at its end has a lateral projection 9. The forward projection 7 on each bar lies in a plane below the bumper proper and the projection 9 at its rear end lies in a plane above the bumper proper so that when the anchors are attached to the frame of the automobile by securing said projections thereto at correspondingly different elevations, the bumper proper is held in a horizontal plane that lies substantially midway between the forward and rear supporting connections of the anchors and the frame.

The projections 7 and 9 may be secured to the frame by any suitable means, such for example, as by the staple-bolts 10 shown at the respective forward ends of the anchors in Fig. 1 and by the bolts 11 at the rear ends thereof.

By connecting the extremities of the bumper proper to the anchors respectively at points thereon between the widely separated forward and rear projections by which the anchors are secured to the frame, and which are positioned in opposite horizontal planes respecting the bumper proper, the rigidity thereby afforded the bumper proper is enhanced.

What I claim is:

1. In a device of the class described, a bumper proper having inturned extremities; and a pair of anchors to which the extremities are respectively secured, each anchor having a forwardly extending downturned end and a rearwardly extending upturned end, each end having a lateral projection for attachment to the frame of the automobile.

2. In a bumper for an automobile having a frame with a convergent end, a bumper proper having interned extremities; and an anchor in fixed relation with each of said extremities, and extending in a plane approximately at right angles thereto, the opposite ends of said anchor being formed suitably for connection with the divergent end of the frame.

In testimony whereof I affix my signature, in presence of two witnesses.

CHARLES BOWEN.

Witnesses:
G. W. METTERT,
WILL NIEBERGALL.